United States Patent [19]
Saito et al.

[11] Patent Number: 5,689,290
[45] Date of Patent: Nov. 18, 1997

[54] LIQUID LEVEL DETECTING MECHANISM AND INK JET RECORDING APPARATUS HAVING THE MECHANISM

[75] Inventors: Atsushi Saito, Yokohama; Akio Okubo, Tokyo; Yasuhiko Ikeda, Sagamihara, all of Japan

[73] Assignee: Canon Kabushiki Kaisha, Tokyo, Japan

[21] Appl. No.: 647,285

[22] Filed: May 9, 1996

Related U.S. Application Data

[63] Continuation of Ser. No. 484,909, Jun. 7, 1995, abandoned, which is a continuation of Ser. No. 74,465, Jun. 10, 1993, abandoned.

[30] Foreign Application Priority Data

Jun. 11, 1992 [JP] Japan ............... 4-176033

[51] Int. Cl.[6] ........................... B41J 2/175
[52] U.S. Cl. ................. 347/7; 73/293; 250/577
[58] Field of Search ................. 347/7; 73/293; 250/577, 237 R

[56] References Cited

U.S. PATENT DOCUMENTS

| | | | |
|---|---|---|---|
| 4,202,267 | 5/1980 | Heinzl et al. | 347/7 |
| 4,313,124 | 1/1982 | Hara . | |
| 4,345,262 | 8/1982 | Shirato et al. . | |
| 4,459,600 | 7/1984 | Sato et al. . | |
| 4,463,359 | 7/1984 | Ayata et al. . | |
| 4,558,333 | 12/1985 | Sugitani et al. . | |
| 4,608,577 | 8/1986 | Hori . | |
| 4,723,129 | 2/1988 | Endo et al. . | |
| 4,737,801 | 4/1988 | Ichihashi et al. | 347/7 |
| 4,740,796 | 4/1988 | Endo et al. . | |
| 4,792,699 | 12/1988 | Duncan | 250/577 |
| 4,977,413 | 12/1990 | Yamanaka et al. | 347/7 |
| 5,166,707 | 11/1992 | Watanabe et al. . | |

FOREIGN PATENT DOCUMENTS

| | | | |
|---|---|---|---|
| 54-056847 | 5/1979 | Japan | B41M 5/26 |
| 59-123670 | 7/1984 | Japan | B41J 3/04 |
| 59-138461 | 8/1984 | Japan | B41J 3/04 |
| 60-071260 | 4/1985 | Japan | B41J 3/04 |
| 258757 | 11/1986 | Japan | B41J 3/04 |
| 156963 | 7/1987 | Japan | B41J 3/04 |
| 63-013733 | 1/1988 | Japan . | |

*Primary Examiner*—Joseph W. Hartary
*Attorney, Agent, or Firm*—Fitzpatrick, Cella, Harper & Scinto

[57] ABSTRACT

A liquid level detecting mechanism for detecting the liquid level in a vessel for storage of liquid, includes a light emitting unit and a light receiving unit disposed opposite to the vessel for storage of liquid or a chamber communicating with the vessel. The light receiving unit detects the liquid level in the vessel in accordance with the quantity of received light from the light emitted from the light emitting unit, and members in contact with liquid which are arranged between the light emitting unit and the light receiving unit, the members being formed of a material having high wettability relative to the liquid.

40 Claims, 4 Drawing Sheets

LIQUID LEVEL DETECTING MECHANISM AND INK JET RECORDING APPARATUS HAVING THE MECHANISM

This application is a continuation of application Ser. No. 08/484,909 filed Jun. 7, 1995 abandoned which is a continuation of application Ser. No. 08/074,465 filed Jun. 10, 1993 now abandoned.

BACKGROUND OF THE INVENTION

1. Field of the Invention

The present invention relates to a liquid level detecting mechanism for detecting a liquid level within a vessel for storage of liquid, and an ink jet recording apparatus having the liquid level detecting mechanism.

2. Related Background Art

Recording apparatuses having the features of a printer, a copying machine, a facsimile apparatus, etc., or recording apparatuses for use as the output device of complex electronic equipment or a work station including a computer or a word processor are constituted to record an image (including character) onto a recording sheet (recording medium) such as a paper or a plastic thin plate, based on the image information (including character information). Such recording apparatuses can be classified into the ink jet system, wire dot system, thermal system and laser beam system, according to the recording method.

In a recording apparatus of the serial type relying on the serial scan method of scanning in a direction transverse to a conveying direction (sub-scan direction) of recording medium, the recording on the recording medium is accomplished in its entirety by repeating the operation of recording (or scanning) the image with recording means mounted on a carriage movable transversely across the recording medium after setting the recording medium at a predetermined recording position, feeding a sheet (or conveying the recording medium) by a predetermined amount after the recording of one line, and then again recording (or scanning) the image at the next line onto the recording medium which is now stopped. On the other hand, in a recording apparatus of the line type relying only on sub-scanning in a conveying direction of recording medium, the recording on the recording medium is accomplished in its entirety by continuously repeating an operation of setting the recording medium at a predetermined recording position, recording one line at a time and then feeding the sheet (pitch feeding).

Among the above recording apparatuses, a recording apparatus of an ink jet system (an ink jet recording apparatus) is configured to perform the recording on the recording medium by discharging the ink from recording means (recording head) in accordance with an image signal, and has the advantages in which recording means can be made compact, high definition images can be recorded at high speeds, the ordinary paper is usable for recording without requiring any special treatment, the running cost is low, noise is hardly produced owing to a non-impact recording method, and the color image is easily recorded by using color inks. In particular, a line-type recording apparatus, using recording means of the full-multi type in which a number of discharge orifices are arranged in a direction of sheet width, allows for higher speed recording.

Specifically, recording means (recording head) of the ink jet system of discharging the ink by the use of heat energy can be easily fabricated with an arrangement of liquid channels (discharge orifices) in high density by forming electricity-heat converters, electrodes, liquid channel walls, and a ceiling plate as the film on a substrate through a semiconductor fabrication process such as etching, vapor deposition or sputtering, thereby allowing for more compact construction. On the other hand, there are a variety of the requirements for the material of recording medium, and in recent years, besides paper or a resin thin plate (e.g., OHP) which is an ordinary recording medium, the use of a thin paper or a processed paper (punched paper for filing, scored paper, or any shaped paper) has been demanded.

The ink jet recording apparatus as mentioned above utilizes a liquid level detecting mechanism to detect the quantity of ink (ink remain) to supply ink to recording means. For this liquid level detecting mechanism, several methods have been proposed, including, for example, a method of detecting the change in resistance between a pair of electrodes arranged at appropriate positions within an ink tank (U.S. Pat. No. 4,202,267), a method of detecting the decrease in pressure within an ink tank caused by decreasing ink remain (U.S. Pat. No. 4,977,413), and a method of optically detecting the height of a float suspended within an ink tank (Japanese Laid-open Utility Application No. 63-13733). Among them, the method of optically detecting is quite significant in utility value, because it has no inconvenience such as corrosion of electrode, and is cheap in construction.

However, conventional optical liquid level detecting mechanisms have adopted a construction of detecting the vertical motion of a light float, wherein the float may be trapped in a wall surface, causing a malfunction due to this trap to decrease reliability. A method for resolving such drawback has been conceived in which instead of the float, the difference in light transmittance between the ink and the air is utilized to detect directly the liquid level. With such method, however, ink droplets sticking to the wall surface may cause a malfunction, resulting in reduced reliability of the detecting mechanism.

The reason why ink droplets sticking to wall surface may cause such malfunction is as follows. That is, liquid droplets sticking to wall surface are substantially semi-spherical, with the lens effect acting on a light ray from a light emitting element to diffuse the light; for example, even when the ink is already absent, any light may not reach light receiving element, whereas "ink presence" is being output in this case, causing a malfunction.

SUMMARY OF THE INVENTION

The present invention has been achieved in light of the above-mentioned technical problems, and an object of the present invention is to provide a reliable liquid level detecting mechanism which is capable of directly detecting the liquid level in a secure manner, and an ink jet recording apparatus having said liquid level detecting mechanism, by eliminating inconveniences associated with the lens effect of liquid droplets sticking thereto without any float.

The present invention accomplishes the above object by providing a liquid level detecting mechanism for detecting the liquid level in accordance with the change in quantity of transmitted light, comprising a light emitting unit and a light receiving unit arranged with part of a vessel for storage of liquid or a liquid chamber communicating to said vessel interposed therebetween, wherein a portion of an inner face of said vessel or said liquid chamber traversed by the transmitted light axis is formed from a member having high wettability relative to the liquid. In addition to the above construction, the present invention can accomplish the above object more efficiently by forming the member having high wettability from fibrous material or porous material, or a member having minute grooves on the surface.

Another present invention can accomplish the above object by providing an ink jet recording apparatus for recording onto recording medium by discharging the ink thereto, comprising a light emitting unit and a light receiving unit arranged with part of a vessel for storage of the ink to be supplied to recording means or an ink chamber communicating with said vessel interposed therebetween, and a liquid level detecting mechanism for detecting the ink level in accordance with the change in quantity of transmitted light, wherein a portion of an inner face of said vessel or said ink chamber traversed by the transmitted light axis is formed from a member having high wettability relative to the ink.

DETAILED DESCRIPTION OF THE PREFERRED EMBODIMENTS

Figure 1:
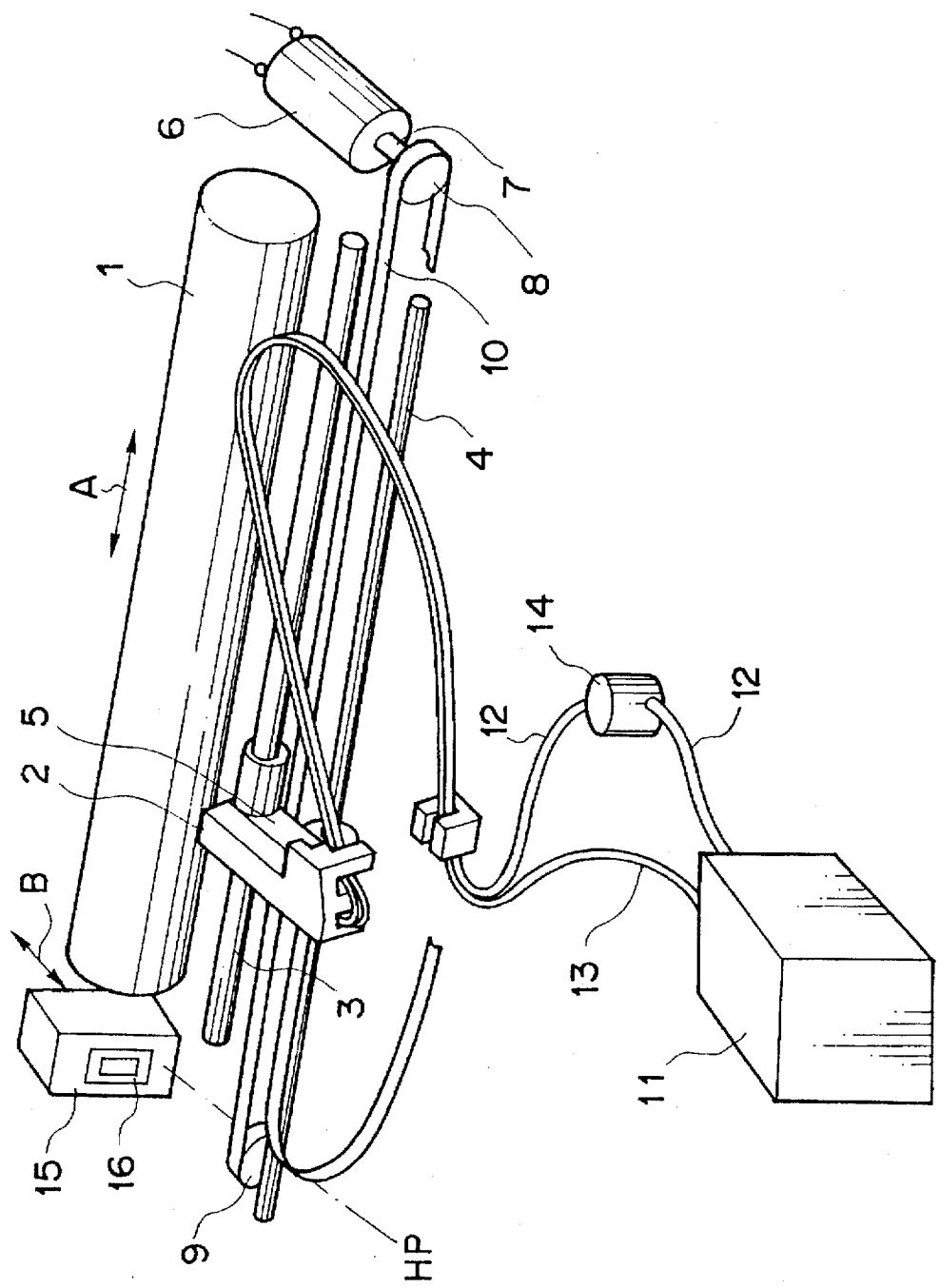
FIG. 1 is a schematic perspective view of an embodiment of an ink jet recording apparatus, in the essence of construction, to which the present invention is applied.

FIG. 1 is a schematic perspective view showing the construction of an embodiment of an ink jet recording apparatus to which the present invention is applied. In FIG. 1, a recording medium such as a paper or a plastic thin plate, in the form of a continuous or cut sheet, is held between a platen roller 1 and a pinch roller (not shown) pressed against it, whereby by controlling the rotation of the platen roller 1 with a motor (not shown), the sheet is fed at predetermined timings or pitches to pass between the platen roller 1 and recording means (recording head) 2.

Recording head 2 is mounted on a carriage 5 for reciprocal movement along two guide rails 3 and 4 in the directions as indicated by the double-headed arrow A. Recording on the recording medium is performed in such a way as to discharge the ink through discharge orifices of recording head 2, based on image information, while the recording head 2 moves (scans) in a recording area opposed to the recording medium. While the recording medium is held at a certain position, one line of recording is performed, after which the platen roller 1 is rotated by a predetermined amount to feed the recording medium by the amount of one line, and then recording of the next line is performed.

The carriage 5 with the recording head 2 mounted thereon is connected to part of a timing belt 10 extended between a pulley 8 secured to a shaft 7 of a scan motor 6 and a tension pulley 9, and is carried for reciprocal movement along the platen roller 1 (recording medium) by controlling the rotation of the scan motor 6.

A main body of the apparatus is provided with an ink tank 11 for supplying the ink to the recording head 2, the ink tank 11 and the recording head 2 being connected via an ink supply tube 12 and an ink return tube 13. And half way along the ink supply tube 12, a pump 14 for feeding by pressure the ink to the recording head 2 is provided. This pump 14 is useful for, in addition to supplying the recording ink to the recording head 2, a recovery pump for circulating the ink to resolve discharge failure due to clogging of discharge orifices of the recording head 2.

Within the movement range of the carriage 5 and outside of the recording region, there is set a home position HP, at which a recovery system 15 movable in the directions (indicated by the arrow B) toward and away from a discharge orifice formation face of the recording head 2 is disposed. The recovery system 15 comprises a cap 16 for preventing ink drying by enclosing discharge orifices of the recording head 2 when not in use, and a suction pump (not shown) for sucking debris such as bubbles or thickened ink together with the ink by generating a negative pressure within the cap in a state of enclosing the discharge orifices.

The recording head (recording means) 2 is the ink jet recording means which discharges the ink by the use of heat energy, comprising electricity-heat converters for generating heat energy. Also, the recording head 2 discharges the ink through discharge orifices by virtue of the change in pressure arising by growth and shrinkage of bubbles due to film boiling caused by heat energy applied from the electricity-heat converters.

Figure 2:
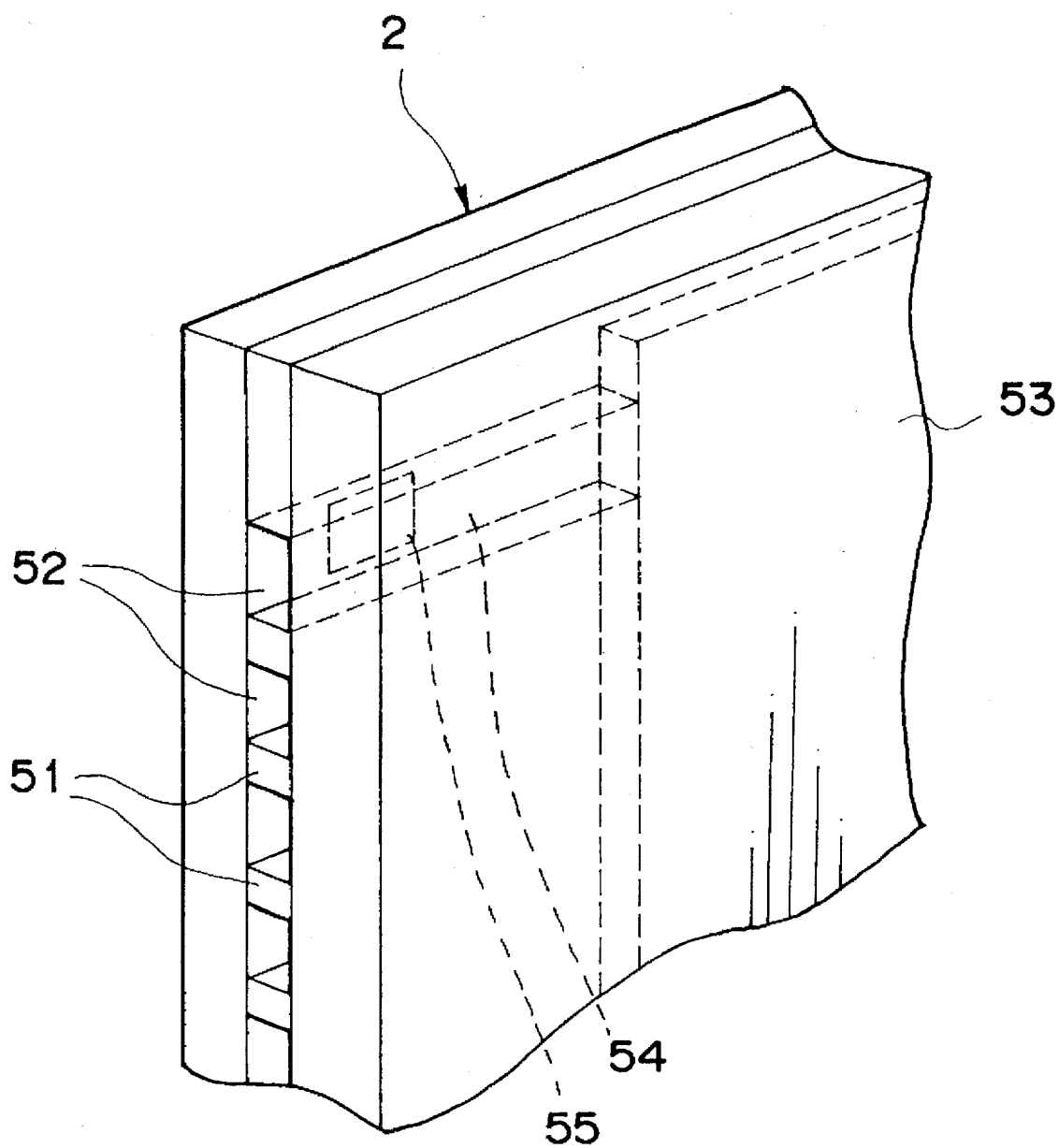
FIG. 2 is a schematic partial perspective view of the construction of an ink discharge unit for recording means as shown in FIG. 1.

FIG. 2 is a partial perspective view schematically showing the construction of an ink discharge unit of the recording head 1. In FIG. 2, on a discharge orifice formation face 51 opposed to the recording medium a predetermined interval apart therefrom (e.g., approximately 0.5 to 2.0 millimeters) are formed a plurality of discharge orifices 52 at a predetermined pitch, with electricity-heat converters (e.g., heat generating resistors) for generating heat energy for ink discharge each being disposed along a wall face of each liquid channel 54 for communicating each discharge orifice 52 to a common liquid chamber 53. The recording head 2 is mounted on the carriage 5 in a positional relation where the discharge orifices 52 are arranged in a direction crosswise to the movement (scan) direction of the carriage 5. In this constitution, recording means (recording head) 2 can discharge the ink through discharge orifices 52 by virtue of the pressure developed in the ink within the liquid channels 54 which is film boiled by driving (energizing) corresponding electricity-heat converters 55 in accordance with an image signal or a discharge signal.

Figure 3:
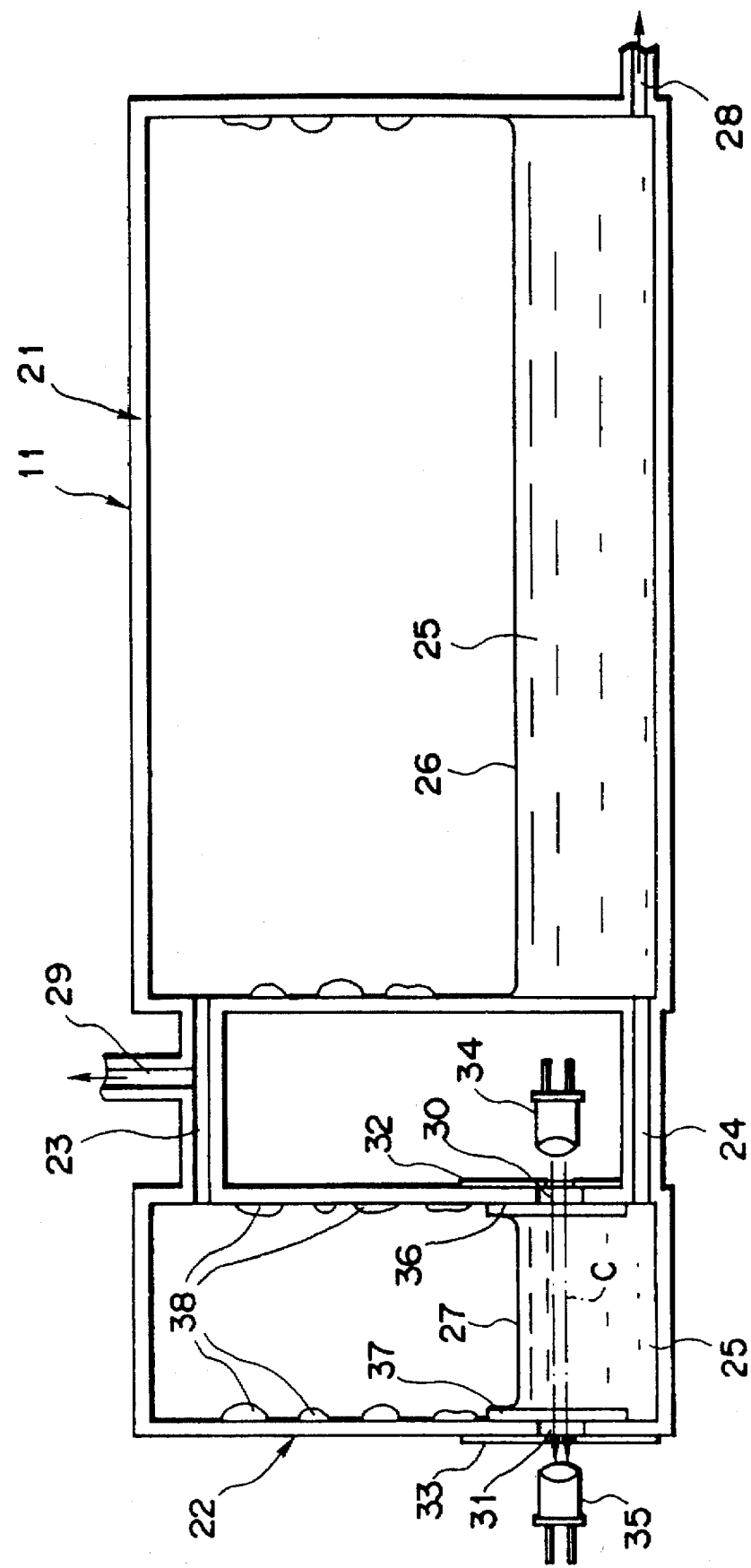
FIG. 3 is a longitudinal cross-sectional view of an embodiment of an ink tank having a liquid level detecting mechanism to which the present invention is applied.

FIG. 3 is a longitudinal cross-sectional view showing the embodiment of an ink tank 11 of the ink jet recording apparatus to which the present invention is applied. In FIG. 3, the ink tank 11 comprises a vessel (ink tank main body) 21 for storage of ink and an ink chamber 22 in communication with the vessel 21, the vessel 21 and the ink chamber 22 being communicated to each other via an upper communicating hole 23 and a lower communicating hole 24, as shown. Accordingly, a liquid level 26 of ink 25 within the vessel 21 and a liquid level 27 of ink 25 within the ink chamber 22 are always at the same height. An ink delivery opening 28 is provided downwardly of the vessel 21, and an atmosphere communicating hole 29 extends vertically from the upper communicating hole 23.

The ink delivery opening 28 is connected with the ink supply tube 12 (FIG. 1), via which the ink 25 within the vessel 21 is supplied through the ink delivery opening 28 to the common liquid chamber 53 within the recording head 2. If the ink 25 is supplied to the recording head 2 with the liquid level 26, 27 falling, air of an equivalent amount will flow through the atmosphere communicating hole 29 into the vessel 21 and the ink chamber 22.

The ink chamber 22 is provided with liquid level detecting means for detecting the ink level (ink remain). That is, transparent windows 30, 31 made of a transparent material are provided in lower partial areas on the wall faces opposed to each other in the ink chamber 22. Outside of the transparent windows 30, 31 and with diaphragm members 32, 33 interposed, there is provided, on one side, a light emitting diode (light emitting means) 34, and a phototransistor (light receiving means) 35 on the other side, both of which are connected to an electrical circuit, not shown. In this constitution, liquid level detecting means can detect the ink level 27 in accordance with the change in quantity of transmitted light.

On a plane inside of each of transparent windows, 30, 31, that is, a part of each inner face of the ink chamber 22 traversed by a light ray (transmitted light axis) C, a plate or sheet-like member 36, 37 having high wettability relative to the ink is bonded. These members 36, 37 having high wettability are formed from a nonwoven fabric of polymer. The members 36, 37 having high wettability are provided to prevent liquid droplets from arising on the wall faces, owing to capillary phenomenon on the surface, as indicated by two-dot chain line in FIG 3. Note that the members 36, 37 having high wettability composed of polymer nonwoven fabric are translucent and thin members, in which the loss in quantity of transmitted light will not be significant in the ink (black ink) permeated state. That is, even in the state where the ink has been permeated, it is ensured that the difference in the quantity of light between when the ink level 27 is higher than the transmitted light axis C and when it is lower than the transmitted light axis C (not transmitting the ink 25) can be determined by amplification with an electrical circuit for detection.

With the above construction, light rays emitted from light emitting diode (light emitting means) 34 will pass across the ink chamber as indicated by the arrow C to reach the phototransistor (light receiving means) 35. When the ink level 27 (ink level 26) is above the transparent windows 30, 31, the light ray C will pass through the ink (e.g., black ink), resulting in a smaller quantity of light reaching the phototransistor (light receiving means) 35. If the ink level 26 is lower as the recording head 2 consumes the ink 25, the ink level 27 within the ink chamber 22 will also fall. And if the ink level 27 (ink level 26) is lower than the transparent window 30, 31, light ray C never passes through the ink, resulting in a greater amount of light reaching the phototransistor 35. An output signal from the phototransistor 35 is coupled to a comparator circuit, so that the ink level 27 (ink remain) on the portion of the transparent windows 30, 31 can be detected in the form of digital output.

According to the embodiment as described above, a member (polymer nonwoven fabric) having high wettability relative to the ink is bonded on the inner face of each transparent window 30, 31, so that it is possible to avoid the lens effect caused by liquid droplets on a wall face sticking to transparent windows 30, 31 becoming substantially semi-spherical. Therefore, it is possible to resolve a conventional inconvenience that the light quantity of reaching the phototransistor 35 may change (decrease) by light diffusion owing to the lens effect. Accordingly, an ink jet recording apparatus utilizing the liquid level detecting means in the ink tank 11 can prevent such a malfunction that ink absence indication is not output, in spite of ink exhaustion, causing undischarge, whereby the reliability of recording apparatus is improved.

Figure 4:
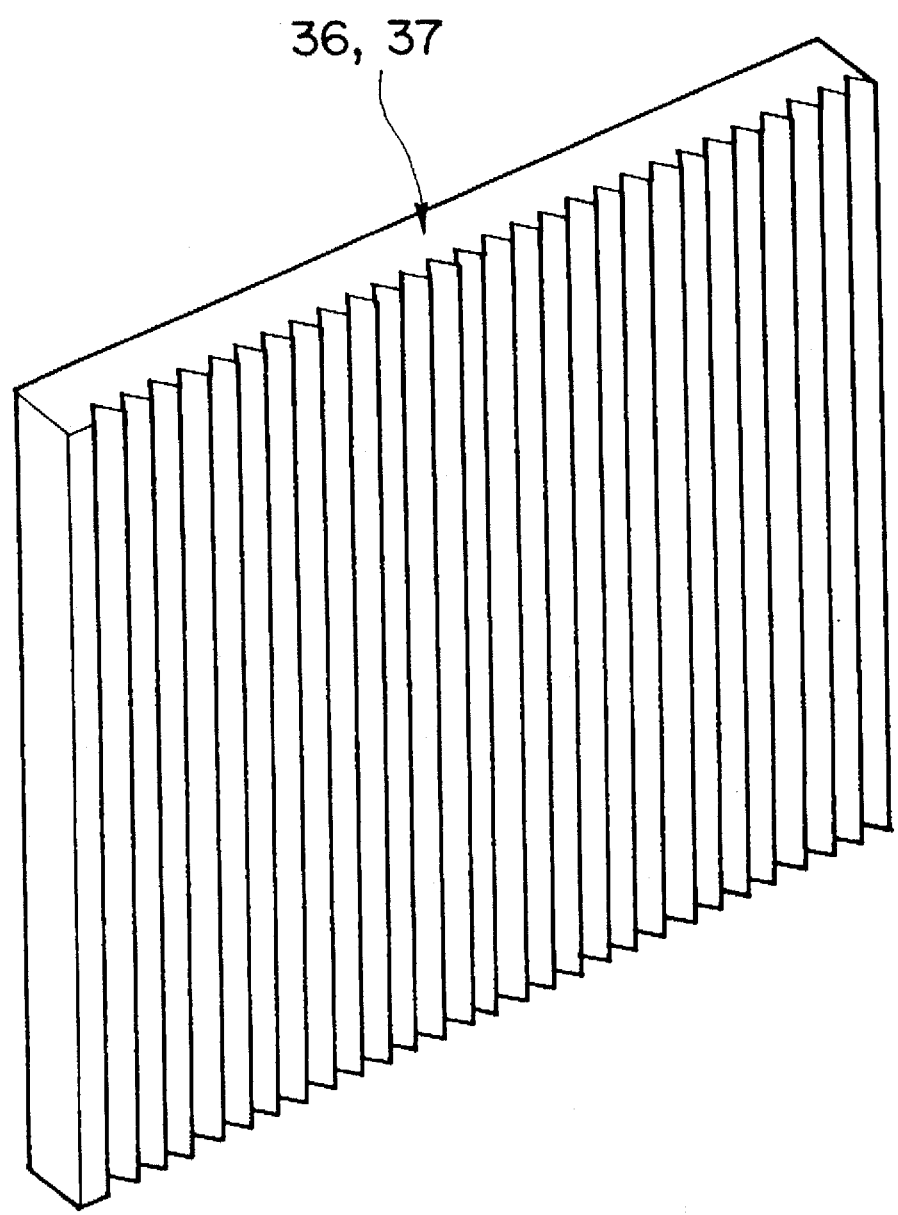
FIG. 4 is a perspective view of another embodiment of a member having high wettability relative to the liquid.

The embodiment disclose above uses members preventing the occurrence of liquid droplets on the wall face, i.e., the members having high wettability relative to the ink used a polymer nonwoven fabric, but as this is aimed to enhance the apparent wettability by allowing ink droplets sticking thereto to permeate into the member due to capillary phenomenon, other fibrous or sponge-like porous materials may be used if they are materials or of dimensions capable of transmitting the light, and further, members having minute grooves on the surface may be used, as shown in FIG. 4. Also, the transparent windows 30, 31 themselves, may be made of a material having high wettability relative to the ink, with the bonding material omitted.

Further, in the previous embodiment, liquid level detecting means is provided in the ink chamber 22 connected to the vessel 21 as the ink tank main body, but the liquid level detecting means may be provided in the vessel 21 by omitting the ink chamber 22. Still further, in the previous embodiment, there was described an instance of detecting the liquid level within the ink tank 11, but the liquid level detecting means according to the present invention is also applicable to a tank unit for storage of liquid other than the ink, with the same effects.

While in the previous embodiment, there was described an ink jet recording apparatus of the serial type in which recording means 2, which may be mounted on the carriage 5, is moved (scanned) along the recording medium, the present invention is also applicable to an ink jet recording apparatus of the line type in which sub-scan is only performed for recording by utilizing a single or a plurality of line recording means having discharge orifices formed over the entire width or partial width of a recording region of the recording medium, with the same effects accomplished.

Also, while in the previous embodiment, there was described an ink jet recording apparatus for recording with a single recording head, the present invention is also applicable to a color ink jet recording apparatus having a plurality of recording means for recording with different colors, or an ink jet recording apparatus for gradation recording utilizing a plurality of recording means for recording with the same color and different densities, without regard to the number of recording means (recording heads) or combinations thereof, with the same effects accomplished. Further, the present invention is also applicable to a constitution in which the recording head and the ink tank are separately provided, and connected via an ink supply tube, and a constitution of using an exchangeable cartridge type recording means with the recording head and the ink tank integrated, whatever constitution and form of recording head and ink tank may be used, with the same effects accomplished.

The present invention is applicable to an ink jet recording apparatus, for example, using recording means (recording head) with electromechanical converters such as piezo-elements, and brings about excellent effects particularly in an ink jet recording apparatus using recording means relying on the method of discharging the ink with the heat energy among the various ink jet recording systems. With such a method, the higher density and higher resolution of recording can be obtained.

As to its representative constitution and principle, for example, one practiced by use of the basic principle disclosed in, for example, U.S. Pat. Nos. 4,723,129 and 4,740,796 is preferred. This system is applicable to either of the so-called on-demand type and the continuous type. Particularly, the case of the on-demand type is effective because, by applying at least one driving signal which gives rapid temperature elevation exceeding nucleus boiling corresponding to the recording information on electricity-heat converters arranged corresponding to the sheets or liquid channels holding a liquid (ink), heat energy is generated at the electricity-heat converters to effect film boiling at the heat acting surface of the recording means (recording head), and consequently the bubbles within the liquid (ink) can be formed corresponding one by one to the driving signals.

By discharging the liquid (ink) through an opening for discharging by growth and shrinkage of the bubble, at least one droplet is formed. By making the driving signals into the pulse shapes, growth and shrinkage of the bubbles can be effected instantly and adequately to accomplish more preferably discharging of the liquid (ink) particularly excellent in response characteristic. As the driving signals of such pulse shape, those as disclosed in U.S. Pat. Nos. 4,463,359 and 4,345,262 are suitable. Further excellent recording can be performnd by employment of the conditions described in U.S. No. 4,313,124 of the invention concerning the temperature elevation rate of the above-mentioned heat acting surface.

As the constitution of the recording head, in addition to the combination of the discharging orifice, liquid channel, and electricity-heat converter (linear liquid channel or right-angled liquid channel) as disclosed in the above-mentioned respective specifications, the constitution by use of U.S. Pat. No. 4,558,333 or 4,459,600 disclosing the constitution having the heat acting portion arranged in the flexed region is also included in the present invention. In addition, the present invention can be also effectively be used with the constitution as disclosed in Japanese Laid-Open Patent Application No. 59-123670 which discloses the constitution using a slit common to a plurality of electricity-heat converters as the discharging portion of the electricity-heat converter or Japanese Laid-Open Patent Application No. 59-138461 which discloses the constitution having the opening for absorbing pressure wave of heat energy correspondent to the discharging portion. That is, the present invention allows for the realization of the secure and efficient recording, in whatever form of the recording head.

Further, the recording head of the full line type may be, in addition to a single recording head integrally formed, the constitution which satisfies its length by a combination of a plurality of recording heads. In addition, among the serial-type recording heads, the present invention is effective for a recording head fixed to the main device, a recording head of the freely exchangeable chip type which enables electrical connection to the main device or supply of ink from the main device by being mounted on the main device, or a recording head of the cartridge type having an ink tank integrally provided on the recording head itself.

Also, addition of a restoration means for the recording head, a preliminary auxiliary means, etc., provided as the constitution of the recording device of the present invention is preferable, because the effect of the present invention can be further stabilized. Specific examples of these may include, for the recording head, capping means, cleaning means, pressurization or suction means, electricity-heat converters or another type of heating elements, or preliminary heating means according to a combination of these, and it is also effective for performing stable recording to perform preliminary mode which performs discharging separate from recording.

As for the type or number of recording heads to be mounted, the present invention is effective to a single recording head provided corresponding to the monochrome ink or a plurality of recording heads corresponding to a plurality of inks having different recording colors or densities, for example. Also, as the recording mode of the recording device, the present invention is extremely effective for not only the recording mode only of a primary color such as black, etc., but also a device equipped with at least one of plural different colors or full color by color mixing, whether the recording head may be either integrally constituted or combined in plural number.

In addition, though the ink is considered as the liquid in the embodiment as above described, another ink may be also usable which is solid below room temperature and will soften or liquefy at or above room temperature, or liquefy when a recording signal is issued as it is common with the ink jet device to control the viscosity of ink to be maintained within a certain range of the stable discharge by adjusting the temperature of ink in a range from 30° C. to 70° C. In addition, in order to avoid the temperature elevation due to heat energy by positively utilizing the heat energy as the energy for the change of state from solid to liquid, or to prevent the evaporation of ink by using the ink which will stiffen in the shelf state, the use of the ink having a property of liquefying only with the application of heat energy, such as liquefying with the application of heat energy in accordance with a recording signal so that liquid ink is discharged, or may already solidify prior to reaching a recording medium, is also applicable in the present invention.

In such a case, the ink may be held as liquid or solid in recesses or through holes of a porous sheet, which is placed opposed to electricity-heat converters, as described in Japanese Laid-Open Patent Application No. 54-56847 or No. 60-71260. The most effective method for the ink as above described in the present invention is based on the film boiling.

Further, a recording apparatus according to the present invention may be used as an image output terminal for the information processing equipment such as a computer, a copying machine in combination with a reader, or a facsimile terminal equipment having the transmission and reception feature.

What is claimed is:

1. A liquid remaining detecting mechanism for detecting a remaining amount of liquid in a container for storing the liquid, comprising:

a light emitting section and a light receiving section provided within the container or a member communicating with the container, said light receiving section detecting the presence or absence of a predetermined liquid in the container based on an amount of light received from said light emitting section; and light permeable liquid guiding means, having a directional component, for guiding the liquid in a direction of liquid level change in the container as the liquid in the container is reduced, said liquid guiding means having high wettability relative to the liquid in a light path from said light emitting section to said light receiving section.

2. The liquid level detecting mechanism according to claim 1, wherein said liquid guiding means is formed of fibrous material.

3. The liquid level detecting mechanism according to claim 1, wherein said liquid guiding means is formed of porous material.

4. The liquid level detecting mechanism according to claim 1, wherein said liquid guiding means is formed of a member having minute grooves on its surface.

5. The liquid remaining detecting mechanism according to claim 1, wherein the presence of the predetermined amount of liquid is detected when a droplet of the liquid is present on said liquid guiding means and the absence of the predetermined amount of liquid is detected when a droplet of the liquid is not present on said liquid guiding means.

6. An ink jet recording apparatus for recording by discharging ink comprising:

ink jet recording means, including discharging orifices for discharging ink;

an ink storage unit, in fluid communication with said ink jet recording means, for storing the ink and supplying the ink to said ink jet recording means;

a light emitting section and a light receiving section provided within said ink storage unit or a member communicating with said ink storage unit, said light receiving section detecting the presence or absence of a predetermined liquid in said ink storage unit based on an amount of light received from said light emitting section; and light permeable liquid guiding means, having a directional component, for guiding the liquid in a direction of liquid level change in said ink storage unit as the liquid in said ink storage unit is reduced, said liquid guiding means having high wettability relative to the liquid in a light path from said light emitting section to said light receiving section.

7. The ink jet recording apparatus according to claim 6, wherein said liquid guiding means is formed of fibrous material.

8. The ink jet recording apparatus according to claim 6, wherein said liquid guiding means is formed of porous material.

9. The ink jet recording apparatus according to claim 6, wherein said liquid guiding means is formed of a member having minute grooves on its surface.

10. The ink jet recording apparatus according to claim 6, wherein said ink jet recording means comprises electricity-heat converters for generating heat energy for use to discharge the ink.

11. The ink jet recording apparatus according to claim 10, wherein said ink jet recording means discharges the ink through the discharge orifices by the use of film boiling occurring in the ink due to heat energy generated by the electricity-heat converters.

12. The ink jet recording apparatus according to claim 6, wherein the presence of the predetermined amount of liquid is detected when a droplet of the liquid is present on said liquid guiding means and the absence of the predetermined amount of liquid is detected when a droplet of the liquid is not present on said liquid guiding means.

13. The ink jet recording apparatus according to claim 6, wherein said liquid guiding means comprises first and second members disposed on an interior surface of said ink storage unit.

14. The ink jet recording apparatus according to claim 6, wherein said liquid guiding means is formed by an interior surface of said ink storage unit.

15. An ink jet recording apparatus for recording ink onto a recording medium, comprising:

ink jet recording means, including discharge orifices, for recording ink on the recording medium;

a mounting unit for mounting said ink jet recording means thereon;

an ink storage unit, in fluid communication with said ink jet recording means, for storing the ink to be supplied to said ink jet recording means;

an ink supply mechanism, cooperating with said ink storage unit, for supplying the ink within said ink storage unit to said ink jet recording means;

a light emitting section and a light receiving section provided within said ink storage unit or a member communicating with said ink storage unit, said light receiving section detecting the presence or absence of a predetermined liquid in said ink storage unit based on an amount of light received from said light emitting section; and light permeable liquid guiding means, having a directional component, for guiding the liquid in a direction of liquid level change in said ink storage unit as the liquid in said ink storage unit is reduced, said liquid guiding means having high wettability relative to the liquid in a light path from said light emitting section to said light receiving section.

16. The ink jet recording apparatus according to claim 15, wherein said liquid guiding member is formed of fibrous material.

17. The ink jet recording apparatus according to claim 15, wherein said liquid guiding member is formed of porous material.

18. The ink jet recording apparatus according to claim 15, wherein said liquid guiding member is formed of a member having minute grooves on its surface.

19. The ink jet recording apparatus according to claim 15, wherein said ink jet recording means comprises electricity-heat converters for generating heat energy for use to discharge the ink.

20. The ink jet recording apparatus according to claim 19, wherein said ink jet recording means discharges the ink through the discharge orifices by the use of film boiling occurring in the ink due to heat energy generated by said electricity-heat converters.

21. The ink jet recording apparatus according to claim 15, wherein the presence of the predetermined amount of liquid is detected when a droplet of the liquid is present on said liquid guiding member and the absence of the predetermined amount of liquid is detected when a droplet of the liquid is not present on said liquid guiding member.

22. The ink jet recording apparatus according to claim 15, wherein said liquid guiding member comprises first and second members disposed on an interior surface of said ink storage unit.

23. An ink jet recording apparatus according to claim 15, wherein said liquid guiding member is formed by an interior surface of said ink storage unit.

24. A liquid level detecting mechanism for detecting the liquid level in a container for storing the liquid, the mechanism comprising:

a light emitting section and a light receiving section provided within the container or a member communicating with the container, said light receiving section detecting the level of liquid in the container based on an amount of light received from said light emitting section; and a liquid guiding member, having a directional component, for guiding the liquid in a direction of liquid level change in the container as the liquid in the container is reduced, said liquid guiding member having high wettability relative to the liquid in a light path from said light emitting section to said light receiving section.

25. The liquid level detecting mechanism according to claim 24, wherein said liquid guiding member is formed of fibrous material.

26. The liquid level detecting mechanism according to claim 24, wherein said liquid guiding member is formed of porous material.

27. The liquid level detecting mechanism according to claim 24, wherein said liquid guiding member is formed of a member having minute grooves on its surface.

28. The liquid remaining detecting mechanism according to claim 24, wherein the presence of liquid is detected when a droplet of the liquid is present on said liquid guiding member and the absence of liquid is detected when a droplet of the liquid is not present on said liquid guiding member.

29. A liquid level detecting device for detecting the liquid level in a container for storing the liquid, the device comprising:
- a light emitting section and a light receiving section provided within the container or a member communicating with the container, said light receiving section detecting the level of liquid in the container based on an amount of light received from said light emitting section; and
- a transparent window disposed in an optical path in said container between said light emitting section and said light receiving section or in a member communicating with said container between said light emitting section and said light receiving section, said transparent window having a portion for preventing a liquid droplet from attaching thereto in said optical path.

30. The liquid level detecting device according to claim 29, wherein said transparent window is formed of fibrous material.

31. The liquid level detecting device according to claim 29, wherein said transparent window is formed of porous material.

32. The liquid level detecting device according to claim 29, wherein said transparent window is formed of a member having minute grooves on a surface thereof.

33. The liquid level detecting device according to claim 29, wherein the presence of liquid is detected when the liquid droplet is present on said transparent window and the absence of liquid is detected when the liquid droplet is not present on said transparent window.

34. An ink jet recording apparatus for recording by using an ink jet recording head, the apparatus comprising:
- an ink storage unit, in fluid communication with said ink jet recording means, for storing the ink an supplying the ink to said ink jet recording means;
- a light emitting section and a light receiving section provided within said ink storage unit or a member communicating with said ink storage unit, said light receiving section detecting the level of ink in said ink storage unit based on an amount of light received from said light emitting section; and
- a transparent window disposed in an optical path in said ink storage unit between said light emitting section and said light receiving section or in a member communicating with said ink storage between said light emitting section and said light receiving section, said transparent window having a portion for preventing an ink droplet from attaching thereto in said optical path.

35. The ink jet recording apparatus according to claim 34, wherein said transparent window is formed of fibrous material.

36. The ink jet recording apparatus according to claim 34, wherein said transparent window is formed of porous material.

37. The ink jet recording apparatus according to claim 34, wherein said transparent window is formed of a member having minute grooves on its surface.

38. The ink jet recording apparatus according to claim 34, wherein the presence of liquid is detected when the ink droplet is present on said transparent window and the absence of ink is detected when the ink droplet is not present on said transparent window.

39. The ink jet recording apparatus according to claim 34, wherein said transparent window comprises first and second members disposed on an interior surface of said ink storage unit.

40. The ink jet recording apparatus according to claim 34, wherein said transparent window is formed by an interior surface of said ink storage unit.

* * * * *

UNITED STATES PATENT AND TRADEMARK OFFICE
CERTIFICATE OF CORRECTION

PATENT NO. : 5,689,290

DATED : November 18, 1997

INVENTOR(S): ATSUSHI SAITO ET AL.

It is certified that error appears in the above-identified patent and that said Letters Patent is hereby corrected as shown below:

ON THE TITLE PAGE AT [57] ABSTRACT

Line 2, "liquid," should read --liquid--.

COLUMN 1

Line 55, "the" should be deleted.

COLUMN 2

Line 4, "the" should be deleted; (second occurrence)
Line 5, "of" should read --of the--.

COLUMN 5

Line 64, "members" should read --members for--;
Line 64, "disclose" should read --disclosed--.

COLUMN 9

Line 5, "orifices" should read --orifices,--;
Line 40, "the" (second occurrence) should read --said--.

UNITED STATES PATENT AND TRADEMARK OFFICE
CERTIFICATE OF CORRECTION

PATENT NO. : 5,689,290

DATED       : November 18, 1997

INVENTOR(S): ATSUSHI SAITO ET AL.

It is certified that error appears in the above-identified patent and that said Letters Patent is hereby corrected as shown below:

<u>COLUMN 12</u>

```
Line 2,  "an" should read --and--;
Line 12, "storage" should read --storage unit--.
```

Signed and Sealed this

Twenty-sixth Day of May, 1998

*Attest:*

BRUCE LEHMAN

*Attesting Officer*     *Commissioner of Patents and Trademarks*